(No Model.)
H. BLACKMAN.
PROCESS OF RECOVERING SODA.
No. 424,756. Patented Apr. 1, 1890.
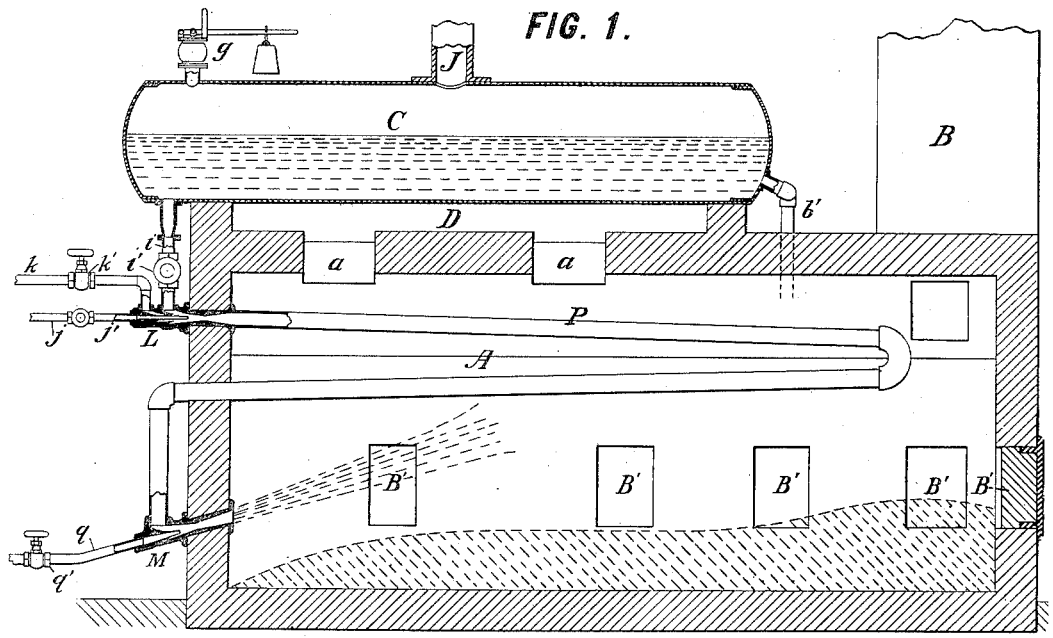
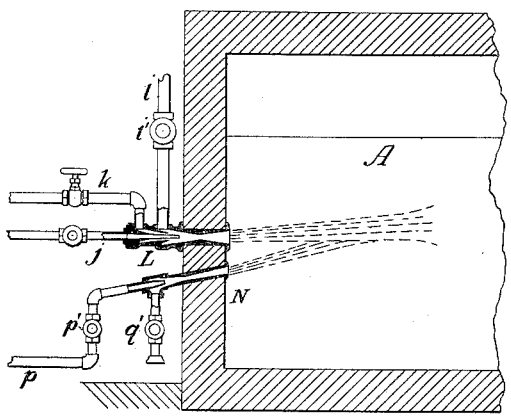
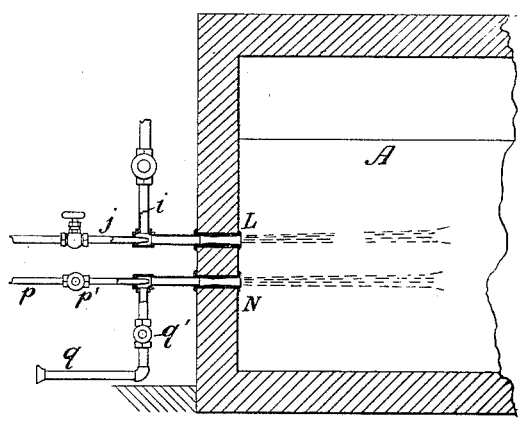
WITNESSES:
J. O. E. Criswell
C. K. Fraser
INVENTOR:
Henry Blackman.
By his Attorneys,
Arthur E. Fraser & Co.

UNITED STATES PATENT OFFICE.

HENRY BLACKMAN, OF NEW YORK, N. Y.

PROCESS OF RECOVERING SODA.

SPECIFICATION forming part of Letters Patent No. 424,756, dated April 1, 1890.

Application filed July 11, 1888. Serial No. 279,606. (No specimens.)

*To all whom it may concern:*

Be it known that I, HENRY BLACKMAN, a citizen of the United States, residing in the city, county, and State of New York, have invented certain new and useful Improvements in the Art of Recovering Refractory Substances from Solutions, &c., of which the following is a specification.

This invention relates to the recovery by evaporation and calcination of refractory substances from solutions in or mixtures with other substances which are volatilizable or destructible by heat. In the recovery of alkalies, lime, and other substances from solution it is customary to resort to calcination in a furnace, in order to expel every particle of water and reduce the substance to anhydrous condition. The calcining process has an important application in the reclaiming of soda or other chemicals from the spent liquors of pulp-digesters. For this and other analogous purposes calcining-furnaces of various kinds and constructions have been used. In such furnaces it is customary to first evaporate the free water and other volatile constituents from the solution by exposure of the latter to the heat of the furnace, and subsequently, when the material under treatment has been reduced to solid or semi-solid condition, to expose it on the hearth or calcining-bed of the furnace to the intense heat of the flames which play across the hearth. It has also been proposed to spray the solution into the furnace directly over the calcining-bed and into the stream of flames and products of combustion flowing through the furnace, whereby the water is evaporated, and the alkali or other matter falls in flakes upon the calcining-bed, where it is stirred and manipulated to expose all portions of the mass to the heat of the furnace, and thereby complete their calcination.

My invention provides an improved method for the recovery of alkalies and other refractory substances from solution in or mixture with other substances which are either vaporizable or combustible.

By my improved process the alkaline or other solution is first (unless it be already of considerable density) concentrated in a vacuum-pan or otherwise to a sirupy consistency or to the greatest practicable density. It is then united with a gaseous or other fluid fuel and preferably, also, with air to support combustion, and is forced through a superheating-pipe, whereby the mixture is superheated, after which it is injected into the calcining-furnace by means of a jet of air, steam, or gaseous fuel under pressure. The force of the jet is such as to project the solution to a considerable distance within the furnace. By being thus injected it is reduced to spray on the principle of the atomizer. The stream of fuel with which the solution is commingled is ignited upon its entrance into the furnace, and burns within the latter throughout the length of the projected blast or until it is completely consumed. In thus burning it vaporizes and expels the water or other volatile substance in the solution, and the refractory ingredient or ingredients of the solution will thereupon fall to the bottom or hearth of the furnace. The material accumulating upon this hearth has its calcination completed by being exposed to the extreme heat of the burning fuel above it. By the simultaneous injection of the solution and the fuel the sprayed or subdivided particles of the solution are subjected to the most intense heat of the furnace and for the longest period of time, whereby the heat is most effectively and economically utilized. The fuel used is preferably gas, such, for example, as natural gas; but it may be liquid fuel, such as petroleum, or pulverized solid fuel, such as extremely fine coal-dust. The gaseous fuel is preferred, because it leaves no ash to be precipitated with the calcined matter.

Having thus given a general description of my improved method, I will now proceed to describe the same somewhat minutely with reference to the accompanying drawings, in which—

Figure 1 is a vertical longitudinal section of a furnace and its accessories constructed for practicing my invention, and Figs. 2 and 3 are modifications thereof.

Let A designate the furnace proper or combustion or calcining chamber, which is built of masonry, by preference, and of any suitable dimensions and proportions, and is provided with a stack or chimney B. Over the furnace is a concentrating-vessel C, which is built into and supported by the masonry, the construction of the latter being such that a heating or reverberatory chamber D is formed over the arched roof of the furnace, into which chamber the vessel C projects and which chamber is heated from the furnace A by the passage of hot gases into it through openings $a\ a$, formed in the arched roof of the furnace. The spent liquor to be recovered or other solution to be treated is introduced into the concentrating-vessel C by pumping it in through a pipe $b'$ or otherwise. The concentration is effected by the heat from the furnace A, and during the concentration the vapors disengaged from the liquid pass out through a pipe J, which is either open to the air or leads to a condenser or air-pump, after the manner common with vacuum-pans, and which is so well understood that I do not deem it necessary to illustrate or describe it. Suitable stirring or scraping devices may be provided to prevent the precipitation of the solid matters in the liquid or their incrustation upon the walls of the vessel C. The liquid, after being sufficiently concentrated in the vessel C, passes out therefrom through a pipe $i$, the flow through which is controlled by a valve $i'$. This pipe leads to an injector L, which is set in the rear wall of the furnace A. Communicating with the injector are two pipes $j$ and $k$, provided with valves $j'$ and $k'$, respectively. One of these pipes ($j$, for instance) leads from a source of natural gas or other gaseous or vaporous fuel, which is preferably under a heavy pressure. The other pipe ($k$, for instance) leads from a source of steam, preferably superheated, and which should be under high pressure. Compressed air, however, may be substituted. The jets of gas and steam or air enter the injector L at a high velocity and draw along with them the liquid from the vessel C, the force of the blast being such as to spray or atomize this liquid. Within the furnace A is a pipe P, which is joined at one end to the injector L, and extends thence back and forth through the furnace as many times as may be desired, finally passing out through the rear wall of the furnace and extending to another injector M. This injector passes through the rear wall of the furnace, preferably at an upward inclination, as shown, and receives compressed air (or superheated steam) through a pipe $q$, controlled by a valve $q'$. The blast of vaporous and gaseous matter in the coil of pipe P receives its motive or propulsive power from the force of the jets of gaseous matter under pressure entering the respective injectors L and M. During the passage of these matters through the coil P they are highly heated by the heat of the furnace A. When finally they enter the furnace through the injector M, the gaseous fuel is instantly ignited and burns throughout the length of the projected blast or stream, which extends preferably nearly or quite the length of the furnace, in order to afford a sufficiently long time for the action upon the solution to take place. The intense heat caused by the combustion of the gas causes it to volatilize the water contained in the solution and convert it into steam, and thereby to separate it, and also to simultaneously separate with it the other volatile constituents of the solution from the non-volatile and non-combustible or refractory constituents thereof—such, for example, in the case of an alkaline solution, as the soda or potash. The intense heat also burns up all the combustible impurities, thereby leaving the soda or potash substantially pure. The alkaline matter as it is thus recovered from the solution drops in the form of flakes or fine particles to the floor or hearth of the furnace, and if it has not already been wholly deprived of moisture its treatment is completed while lying on the hearth by the expulsion from it of all moisture, owing to the intense heat emanating from the flames playing above it, whereby it is rendered completely anhydrous.

When a sufficient mass of calcined matter has accumulated upon the hearth, it may be removed through a door $B'$ at the front end or at either side of the furnace by raking or shoveling it out. The calcining operation should be suspended during the removal of this matter, or else the furnace should be so constructed that the under portion of the pile can be removed through small low openings in such manner as not to admit air through these openings into the furnace to chill the flames therein and retard the combustion. Sufficient air should be injected with the gaseous fuel to maintain the combustion, or else air may be separately admitted to the furnace through registers or dampers, as is usual with boiler-furnaces. If the air is injected, it may be introduced either at the injector L or at the injector M, as preferred.

It is necessary that sufficient motive power to maintain the blast properly shall be provided by means either of the current of steam or compressed air entering the upper injector through the pipe $k$, or of the gas entering through the pipe $j$, or of compressed air or superheated steam entering the lower injector at the pipe $q$. It is preferable that a sufficiently forcible blast shall be supplied to each of the injectors; but it may be sufficient to rely upon a jet at either one of the injectors alone for this purpose. Where natural gas is to be had under high pressure—say, for example, from one hundred to two hundred pounds per square inch—the force of the gas alone will be sufficient to provide the motive power for the blast and for the spraying or atomizing of the liquid under treatment. Where gas at a sufficiently high pressure is not obtainable, a forcible current of steam may be used, which for the upper injector may be superheated or not; but for the lower injector it should be superheated, or in lieu of steam a current of compressed air may be employed. It is preferably taken hot, as it comes from the compressor, or a mixture of steam and compressed air may be used.

In case the concentrating operation in the vessel C is carried on continuously during the calcining process, the force of the injection must be sufficient to draw down the liquid from the vessel C against the atmospheric pressure occasioned by the vacuum therein. The concentration may, however, be carried on under atmospheric pressure or even under a pressure of steam in the vessel C, in either of which cases the liquid under treatment will flow from the vessel C to the injector of itself. This method of concentration, however, is slower and less perfect than with the vacuum-pan. If the operation is intermittent, the vessel C may be operated first as a vacuum-pan, and then by closing the vacuum-valve in the pipe J and accumulating a pressure its contents may be blown off with a force which will contribute more or less to the strength of the blast from the injectors.

By the simultaneous injection of the solution to be treated and the fuel the two are intimately commingled, and the solution being finely subdivided or atomized by the injection is subjected to the most intense heat that is generated within the furnace, since it is carried along with the fuel the combustion of which generates the heat. By also injecting air to maintain the combustion simultaneously with the fuel and the solution to be treated the fuel is caused to ignite instantly and to burn throughout the whole of the projected blast.

In practicing my invention it is preferable to use gaseous fuel—such as natural gas—for the reason that it leaves no ash to be subsequently separated from the calcined material; but in locations where it is not practicable to secure such fuel a liquid fuel may be used—such as petroleum—or even a finely-comminuted solid fuel may be employed, such as fine coal-dust. It is of course essential with the use of either solid or liquid fuel to provide a blast of gaseous or vaporous matter under pressure, as a vehicle, for propelling the fuel and injecting it with sufficient force into the furnace. When solid fuel is employed, its condition must be such that its particles will move freely on one another, so that it may be properly propelled by the blast.

My invention is not limited in its application to recovery of materials in solution or mixture with liquids, but is also applicable in part to the treatment of solid matters, provided they are in a state of sufficient comminution to be properly carried and propelled by the gaseous blast.

My invention finds an important application in the extraction of common salt, (sodium chloride.) The saline solution or brine is first concentrated to a maximum density, and is then superheated and injected in an atomized blast into the furnace along with the fuel and air. The heat vaporizes and expels the water and the solid salt falls to the hearth of the furnace. Inasmuch as salt is refractory only to a comparatively low degree, being liable to decomposition by too great a heat, the temperature within the furnace should be so regulated as not to decompose the salt.

My invention is also applicable in the manufacture of soda and potash, as well as in their recovery from spent solutions. The details of the treatment will be apparent to any one familiar with the art of manufacturing soda or potash. For example, in potash-making the lye or liquor resulting from lixiviation of vegetable ash may be concentrated to such point that upon cooling the potassium sulphate crystallizes, after which the mother-liquor, which is separated from the crystals, is injected or sprayed into the furnace simultaneously with the fuel and either with or without having been further concentrated; and in applying my invention in the manufacture of soda by the Leblanc method the sodium sulphate is injected into the furnace by a suitable blast along with calcium carbonate and carbon, all finely powdered. The heat of the flames accompanying them effects the reaction by which the crude soda is produced, and this after falling to the hearth is calcined by the heat. If it is purified by the process of lixiviation and subsequent concentration of the lye, my invention is further available in the latter operation by injecting the lye into the furnace with the fuel and subsequently calcining the soda on the hearth.

Thus it is seen that my invention is applicable in those instances where two or more substances mixed together are caused to chemically combine by heating them to such degree as to effect their reaction and, thereby drive off or burn up the substance or substances liberated by their reaction, or the substance or substances in which one or more, or both, of the agents was held in solution or suspension.

I claim as my invention the improvements in the art of recovering refractory substances from solutions in or combinations or mixtures with volatilizable or combustible materials defined as follows, substantially as hereinabove specified, viz:

1. The process consisting in superheating the substance to be treated and subsequently discharging it into a furnace in contact with the fuel to support combustion.

2. The process consisting in uniting the substance to be treated with the fuel, superheating them, and injecting them in a blast into a furnace.

3. The process consisting in atomizing the substance to be treated by gaseous or vaporous blast, subsequently superheating them, and finally injecting them into a furnace.

4. The process consisting in uniting the substance to be treated with the fuel and air, superheating them, and then injecting them into a furnace.

5. The process consisting in atomizing the substance to be treated by means of a gaseous or vaporous blast, subsequently superheating the mixture, and finally injecting it by means of a second blast into a furnace.

In witness whereof I have hereunto signed my name in the presence of two subscribing witnesses.

HENRY BLACKMAN.

Witnesses:
ARTHUR C. FRASER,
GEORGE H. FRASER.